United States Patent [19]

Chen

[11] Patent Number: 5,598,744
[45] Date of Patent: Feb. 4, 1997

[54] RACING HANDLEBAR STRUCTURE SUITABLE FOR ROTATION SHIFTERS DISPOSED THERETO

[76] Inventor: Kun-tsai Chen, No. 106, Nanchuang Village, Ta-ai Hsiang, Taichung Hsien, Taiwan

[21] Appl. No.: 503,548

[22] Filed: Jul. 18, 1995

[51] Int. Cl.⁶ .......................... B62K 21/18; B62K 23/04
[52] U.S. Cl. ..................... 74/551.1; 74/489; 403/362
[58] Field of Search .................... 74/489, 502.2, 74/506, 551.1, 551.8; 403/362

[56] References Cited

U.S. PATENT DOCUMENTS

| | | | |
|---|---|---|---|
| 976,227 | 11/1910 | Stockham | 403/362 |
| 2,117,798 | 5/1938 | Gascoigne et al. | 403/362 |
| 3,336,048 | 8/1967 | Papucki | 74/551.8 |
| 4,250,770 | 2/1981 | Robertson, Jr. | 74/551.1 |
| 5,144,859 | 9/1992 | Malone | 74/551.1 |
| 5,241,877 | 9/1993 | Chen | 74/502.2 |
| 5,435,204 | 7/1995 | Marui | 74/551.1 |

FOREIGN PATENT DOCUMENTS 563343  8/1944  United Kingdom ............... 74/551.1

Primary Examiner—Vinh T. Luong
Assistant Examiner—Mary Ann Battista
Attorney, Agent, or Firm—Watson Cole Stevens Davis, P.L.L.C.

[57] ABSTRACT

A racing handlebar structure suitable for shifters to be disposed thereto, the handlebar including two symmetrical parts each having a dropped handle portion and a horizontal portion which has a neck portion with a smaller diameter, each neck portion having a first hole defined therein and a shifter mounted to the corresponding neck portion, a sleeve having two second holes defined therein and received in a handlebar stem, each neck portion inserted into a corresponding end of the sleeve and the first holes and the second holes aligned with each other for bolts inserted therethrough, a fastener securely disposed the sleeve to the neck portion such that the shifter is rotatably disposed to the corresponding neck portion.

1 Claim, 3 Drawing Sheets

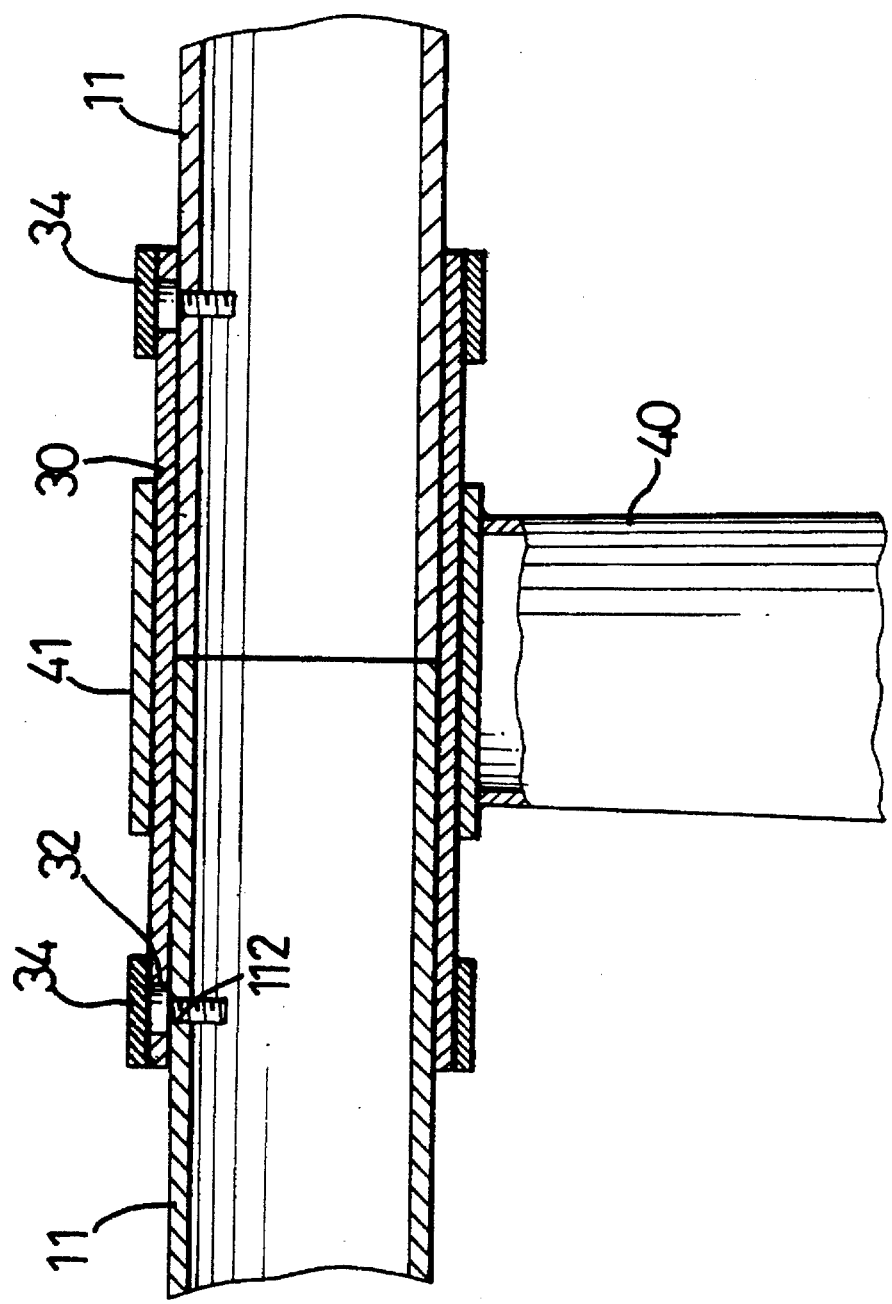

RACING HANDLEBAR STRUCTURE SUITABLE FOR ROTATION SHIFTERS DISPOSED THERETO

BACKGROUND OF THE INVENTION

1. Field of the Invention

The present invention relates to a racing handlebar structure and more particularly, to a racing handlebar structure suitable for rotation shifters longitudinally disposed thereto.

2. Related Prior Art

Generally, a modern bicycle is equipped with shifters which are disposed to the down tube or handlebar stem of the bicycle, and thus an operator must move one of his/her hands from the handlebar to the shifters so as to operate the shifters. However, when operating the shifters, the handlebar is controlled by only one hand of the rider which could be dangerous especially when riding on a rugged road. There is another kind of rotation shifter which is longitudinally disposed to a substantially horizontal handlebar, and such a shifter provides an advantage that the rider simply rotates the handlebar to change the speed of the bicycle. Although the rotation shifters are advantageous for the rider to operate directly on the handlebar by a rotating action, it is not suitable to be disposed to a racing handlebar because the racing handlebar has two curved or dropped handle portions which prevent the rotation shifter from being slid thereonto.

The present invention intends to provide a racing handlebar structure which is suitable for the rotation shifters to be disposed thereto and this mitigates and/or obviates the above-mentioned problems.

SUMMARY OF THE INVENTION

The present invention provides a racing handlebar structure suitable for shifters disposed thereto, the handlebar including two symmetrical parts each having a dropped handle portion and a neck portion with a smaller diameter, each neck portion having a first hole defined therein and a shifter mounted to the corresponding neck portion, a sleeve having two second holes defined therein and received in a handlebar stem, each neck portion being inserted into a corresponding end of the sleeve and the first holes and the second holes being aligned with each other for bolts inserted therethrough, a fastener being Securely disposed the sleeve to the neck portion such that the shifter is rotatably disposed to the corresponding neck portion.

It is an object of the present invention to provide a racing handlebar structure which is suitable for shifters longitudinally disposed thereto.

Other objects, advantages, and novel features of the invention will become more apparent from the following detailed description when taken in conjunction with the accompanying drawings.

BRIEF DESCRIPTION OF THE DRAWINGS

FIG. 3 is a side elevational view, partly in section, of the handlebar and the sleeve disposed to the handlebar stem.

DETAILED DESCRIPTION OF THE PREFERRED EMBODIMENT

Figure 1:
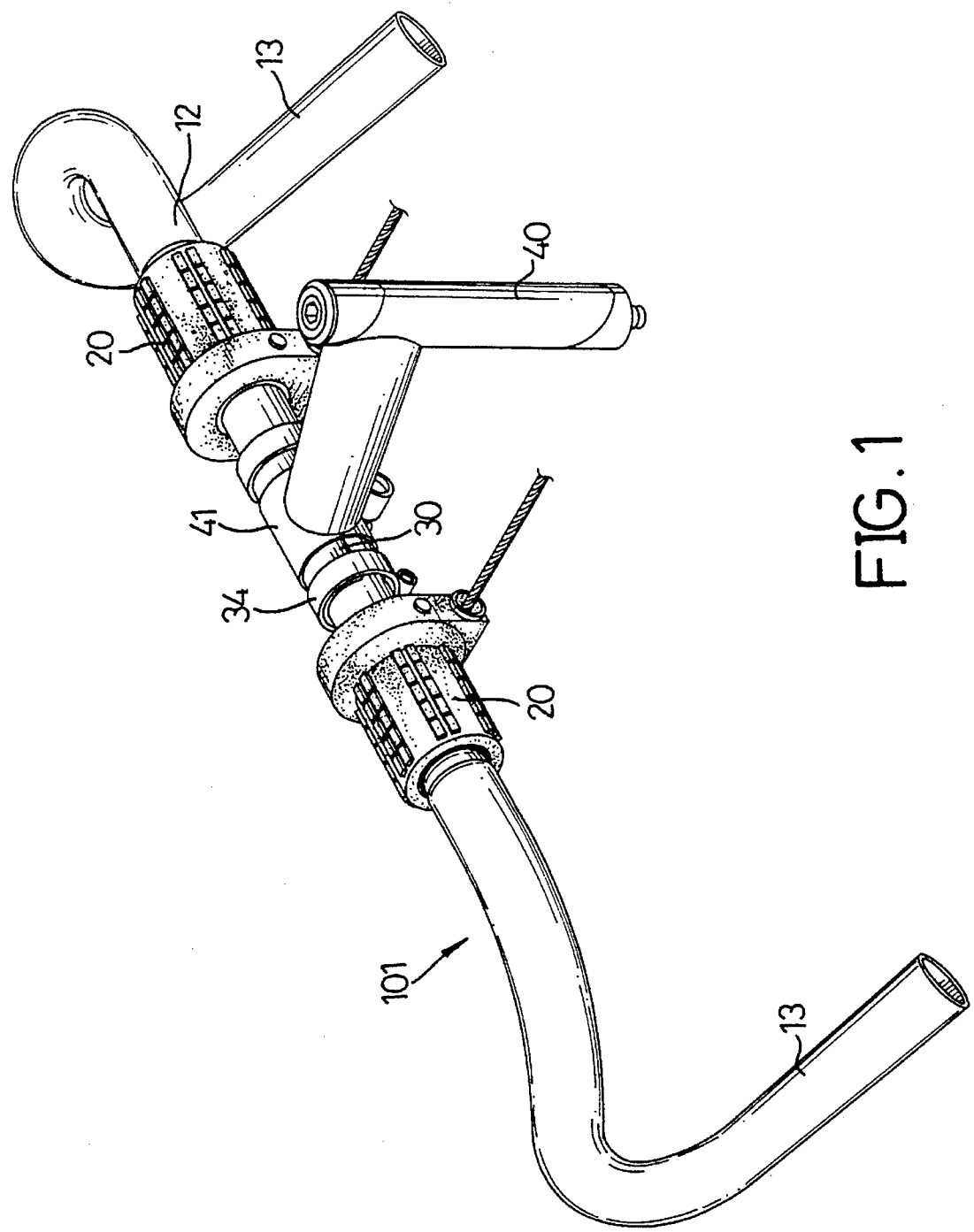
FIG. 1 is a perspective view of the racing handlebar to which shifters rotatably are disposed in accordance with the present invention.
Figure 2:
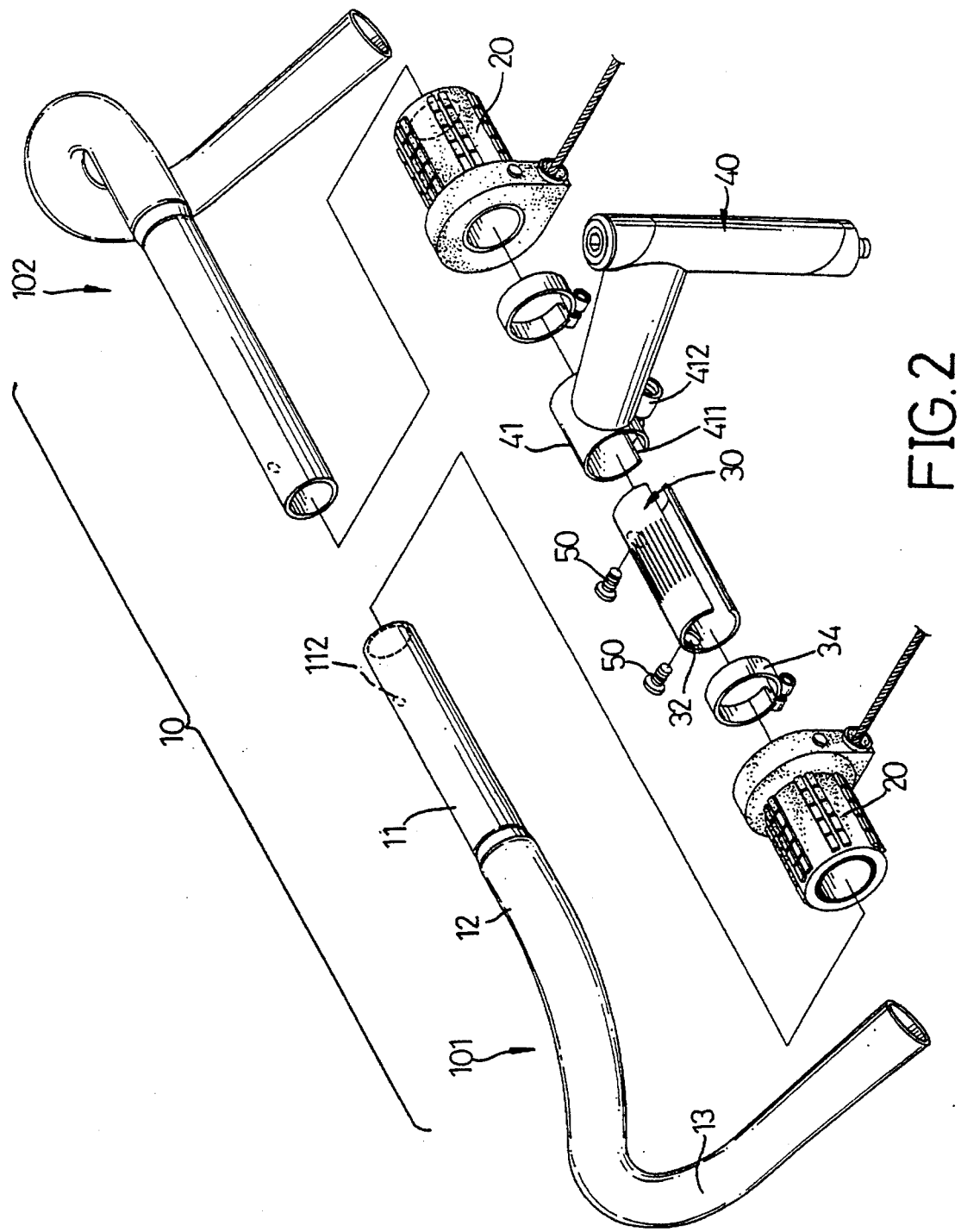
FIG. 2 is an exploded view of a handle bar stem, two parts of the handlebar, a sleeve and two shifters in accordance with the present invention.

Referring to the drawings of FIGS. 1 through 3, a racing handlebar 10 in accordance with the present invention generally includes a first part 101 and a second part 102, each of the first part 101 and the second part 102 having a structure symmetrical with each other. Taking the first part 101 for description purposes, said first part 101 includes a horizontal portion 12 and a dropped handle portion 13 which extends from an end of the horizontal portion 12, the other end of the horizontal portion 12 having a neck portion 11 with a smaller diameter compared with that of the horizontal portion 12 and the neck portion having a first hole 112 defined therein.

A sleeve 30 has a C-shaped cross section and two second holes 32 defined therein corresponding to the first holes 112 respectively and the sleeve 30 can be inserted in a fastening tube 41 of the handlebar stem 40 wherein the fastening tube 41 has a slot 411 longitudinally defined therein which can be closed and thus clamp the sleeve 30 in the fastening tube 41 by threading a bolt 412 through a lug (not shown) extending from each side defining the slot 411.

When assembling the handlebar in accordance with the present invention, a rotation shifter 20 is mounted to the corresponding neck portion 11 firstly and each of the neck portions 11 is then respectively inserted in an end of the sleeve 30 which is securely disposed to the fastening tube 41 of the handlebar stem 40 such that the first holes 112 and the second holes 32 are in alignment with each other for a bolt 50 to be inserted therethrough to assure the neck portions 11 will not become disengaged from the handlebar stem 40. A fastener 34 is a C-shaped element which is mounted to the sleeve 30 so as to securely retain the sleeve 30 to the neck portion 11.

Accordingly, the rotation shifters 20 can be disposed to the racing handlebar 10 in accordance with the present invention and a user operates the shifter 20 without removing his/her hand from the handlebar 10. This meets the requirement of the user when riding a bicycle equipped with the racing handlebar.

Although the invention has been explained in relation to its preferred embodiment, it is to be understood that many other possible modifications and variations can be made without departing from the spirit and scope of the invention as hereinafter claimed.

I claim:

1. A racing handlebar structure suitable for rotation shifters to be disposed thereto, said racing handlebar comprising a first part and a second part of symmetrical construction, each said part including a horizontal portion and a dropped handle portion which extends from an end of said horizontal portion, the other end of said horizontal portion having a neck portion with a smaller diameter, each said neck portion having a first hole defined therein;

a sleeve having a C-shaped cross section and two second holes defined therein corresponding to said first holes respectively, and each of said neck portions respectively inserted in an end of said sleeve such that each said first hole is in alignment with each said second hole respectively for a bolt to be inserted therethrough, wherein a handlebar stem securely receives said sleeve, a fastener securely mounted to said sleeve and each said neck portion.

* * * * *